April 2, 1929.  B. H. ANIBAL  1,707,750
CAM SHAFT OILING
Filed July 19, 1926
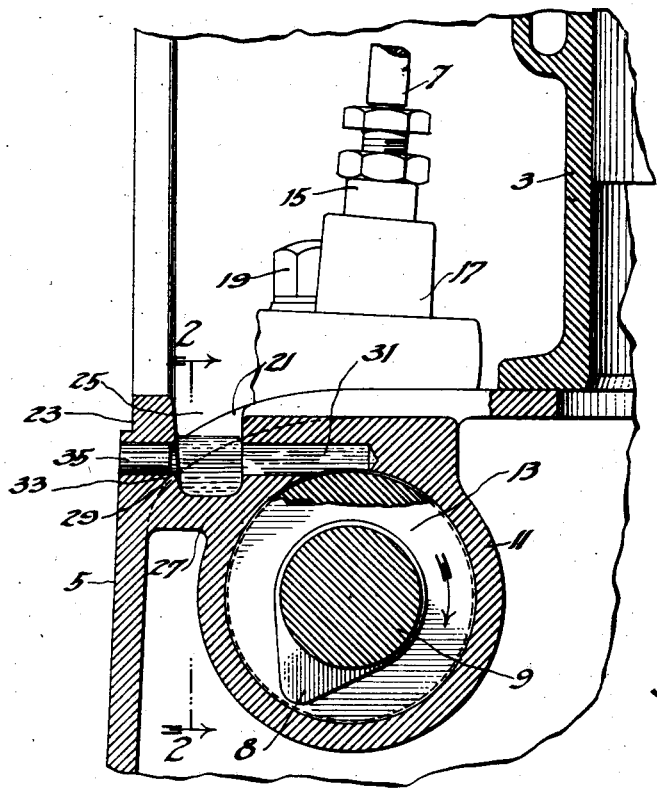
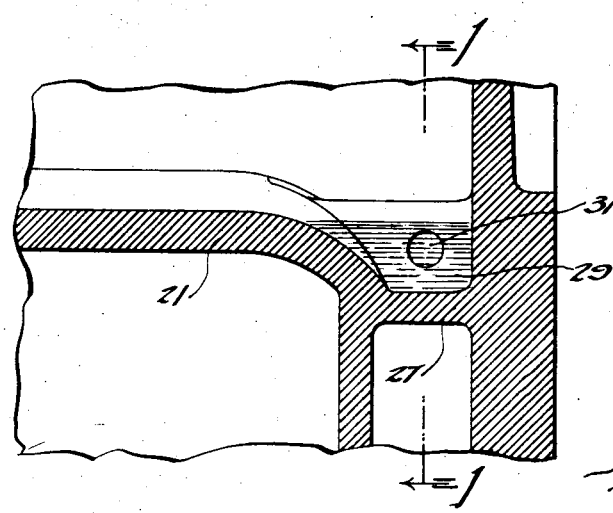
Benjamin H. Anibal Inventor
By Blackmore, Spencer & Flint
Attorneys Patented Apr. 2, 1929.

1,707,750

UNITED STATES PATENT OFFICE.

BENJAMIN H. ANIBAL, OF PONTIAC, MICHIGAN, ASSIGNOR TO GENERAL MOTORS CORPORATION, OF DETROIT, MICHIGAN, A CORPORATION OF DELAWARE.

CAM-SHAFT OILING.

Application filed July 19, 1926. Serial No. 123,387.

This invention relates to lubrication. It is concerned with a provision of means for lubricating the bearings of the cam shaft of an internal combustion engine.

The primary object of the invention is to satisfactorily lubricate the several cam shaft bearings. A secondary object is the utilization of oil over-flowing from between the valve tappets and their guides. Economy in manufacture of the means to lubricate the cam shaft bearing should be included among the more incidental objects.

For the attainment of the above and other objects the invention is embodied in certain structure herein described and shown in the accompanying drawing.

In the drawing:

Figure 1 is a transverse section through the crank case showing the cam shaft and one of its bearings in section, the figure being on line 1—1 of Figure 2.

Figure 2 is a longitudinal section on line 2—2 of Figure 1.

Referring by reference characters to the drawing, numeral 3 represents the cylinder block which is mounted, as shown, upon crank case 5. The cam shaft and the connecting rods are omitted from the drawing, these parts being of usual structure. Numeral 7 designates one of the valves. These valves are reciprocated by cams 8 on cam shaft 9, rotatably mounted in cam shaft bearing 11 in the crank case, suitable journals 13 being provided on the shaft. The cam actuates the valves by means of tappet rods 15, the latter slidable in guides 17 secured to the upper face of the crank case by means of bolts 19.

Upon the reciprocation of the tappet rods in their guides oil from the crank case furnishes the necessary lubrication and an excess of oil over-flows from between these parts. By this invention the excessive oil is used to advantage to lubricate the cam shaft bearings. It should be observed that the top of the crank case is formed with an outwardly and downwardly sloping upper wall 21, terminating a ledge 23, the wall and the ledge forming a longitudinal channel 25. This sloping upper wall is depressed adjacent each bearing, the depression at the front bearing being shown at 27 to form a pocket 29. From a position near the bottom of each pocket there is bored out a conduit 31 leading to a point adjacent the top of the cam shaft bearing. In boring out this passage there is necessarily formed an opening 33 from the outer wall which will, of course, be closed by a plug 35.

The operation will be obvious. When the engine is in operation excess oil from between the tappet rods and their guides collects in the channel 25 and the pockets from which it flows to the top of the cam shaft bearing, which bearings are thus sufficiently lubricated. It may be added that there is always sufficient oil present to lubricate the cam shaft bearing and that the surface oil, which has been the source of annoyance, is put to work by a construction at once simple and economical in production.

I claim:

1. In an engine, a rotating shaft, bearings therefor, a reciprocating rod, a guide for said rod, means to convey excess oil from around the said rod and escaping from the upper end of said guide to said shaft bearing.

2. In an explosive engine, a rotating cam shaft, bearings therefor, a reciprocating push rod, a guide therefor, means to convey excess oil from around said push rod and escaping from the upper end of said guide to said shaft bearing.

3. In an explosive engine, a crank case, cam shaft bearing therein, valve push rods reciprocably mounted therein, guides for said push rods, the rods and guides positioned to receive lubricating oil from the crank case, the crank case being formed on its exterior with pockets and passages therefrom leading to the cam shaft bearings whereby the excess oil from the push rods is conveyed to the cam shaft bearings.

In testimony whereof I affix my signature.

BENJAMIN H. ANIBAL.